United States Patent [19]
Wendt et al.

[11] Patent Number: 6,067,558
[45] Date of Patent: May 23, 2000

[54] METHOD AND APPARATUS FOR PROVIDING INCREASED CONTENT FROM A RESOURCE CONSTRAINED DEVICE

[76] Inventors: James Gordon Wendt, 11260 Rosemary, Auburn, Calif. 95603; James Eugene Clough, 465 E. Wakely St., Meridian, Id. 83642; John David Beninga, 5233 Del Vista Way, Rocklin, Calif. 95765

[21] Appl. No.: 08/932,928

[22] Filed: Sep. 18, 1997

[51] Int. Cl.[7] ...................................................... G06F 15/16
[52] U.S. Cl. .......................... 709/202; 709/225; 709/228; 709/230; 709/250
[58] Field of Search .................................... 709/225, 228, 709/230, 250, 202

[56] References Cited

U.S. PATENT DOCUMENTS

| | | | |
|---|---|---|---|
| 5,742,845 | 4/1998 | Wagner | 395/831 |
| 5,751,956 | 5/1998 | Kirsch | 395/831 |
| 5,802,530 | 9/1998 | Van Hoff | 707/513 |
| 5,812,769 | 9/1998 | Graber et al. | 395/200.12 |

*Primary Examiner*—Le Hien Luu
*Assistant Examiner*—Stephan Willett

[57] ABSTRACT

A Web-based peripheral management solution based upon JAVA applets and a top-level user interface (UI) generator located on a content server includes HTTP daemons (i.e. Web servers) which run on both a peripheral device interface and a host machine content server. Web browser accesses to the peripheral device HTTP daemon for peripheral or other content are redirected by the peripheral device HTTP daemon to a content server where the actual HTML or JAVA applet files are stored. The peripheral device interface also generates HTML stub files to aid in redirecting accesses to JAVA applets on the content server.

25 Claims, 7 Drawing Sheets

METHOD AND APPARATUS FOR PROVIDING INCREASED CONTENT FROM A RESOURCE CONSTRAINED DEVICE

BACKGROUND OF THE INVENTION

1. Technical Field

The invention relates to electronic networks. More particularly, the invention relates to a method and apparatus for providing increased content from a resource constrained device.

2. Description of the Prior Art

With the explosive growth of the Internet, computer users and network administrators are requiring that they be able to access and administer systems via a World Wide Web (Web) browser. The graphical interfaces to which users have become accustomed require large amounts of data storage. Systems that have large amounts of disk storage are able to present this information directly to the user.

Embedded systems, such as printers and other peripheral devices, typically have less data storage capacity. This lack of capacity limits the content that such embedded devices can provide directly to a user. As a result of this lack of storage capacity, such embedded devices must present a less elegant, non-intuitive interface to a user, e.g. an interface that is presented textually with few graphical images. This may cause confusion to the user as to how to access information on the device and how to configure the device.

It would be advantageous to provide a technique that allows a resource constrained embedded device to offer greater content to a user when the device is accessed, for example, where the device supports a commonly accepted Web browser metaphor.

SUMMARY OF THE INVENTION

The invention provides an HTTP redirector that solves the problem of providing a sophisticated graphical user interface for resource constrained embedded devices by allowing such devices to present more content to the end user without storing the data locally. This data is provided by the use of a content server, as well as the content server's resources, to present the information to the user. The redirect scheme herein allows the bulk of the embedded device specific content (e.g. HTML and/or JAVA applet files) to reside on a content server, rather than on the peripheral device itself.

The invention also allows JAVA applets, located on a content server, to be used to implement peripheral specific content and pages. The JAVA language is attractive for such application because it provides a more powerful programming environment than HTML for constructing interactive user interface programs and for refreshing status displays. Using the content server's resources therefore allows the resource constrained device to present richer content to the user. Further, by using the herein disclosed redirector, a device may readily present JAVA applets that require more memory than is locally available, thus resulting in substantial resource leverage.

The invention provides functionality that supports a Web-based peripheral management solution based upon JAVA applets and a top-level user interface (UI) generator located on a content server. In the herein disclosed scheme, hyper text transfer protocol (HTTP) daemons (i.e. Web servers) run on both a peripheral device interface and a host machine content server. Web browser accesses to the peripheral device HTTP daemon for peripheral or other content are redirected by the peripheral device HTTP daemon to a content server where the actual hyper text markup language (HTML) or JAVA applet files are stored. The peripheral device interface also generates HTML stub files to aid in redirecting accesses to JAVA applets on the content server.

DETAILED DESCRIPTION OF THE INVENTION

The invention provides an HTTP redirector that solves the problem of providing a sophisticated graphical user interface for resource constrained embedded devices by allowing such devices to present more content to the end user without storing the data locally. This data is provided by the use of a content server, and the content server's resources, to present the information to the user. The redirect scheme herein allows the bulk of the embedded device specific content (e.g. HTML and/or JAVA applet files) to reside on a content server, rather than on the peripheral device itself.

The invention also allows JAVA applets, located on a content server, to be used to implement peripheral specific content and pages. The JAVA language is attractive for such application because it provides a more powerful programming environment than HTML for constructing interactive user interface programs and for refreshing status displays. Using the content server's resources therefore allows the resource constrained device to present richer content to the user. Further, by using the herein disclosed redirector, a device may readily present JAVA applets that require more memory than is locally available, thus resulting in substantial resource leverage.

The invention, as described herein in connection with the presently preferred embodiment, operates in an electronic network in conjunction with host software which delivers Web-based management capabilities for peripheral devices. The peripheral devices are directly attached to the network via the novel interfaces (the "interface") set forth herein. The host software may be any generic software that runs on a content server (e.g. as CGI-bin scripts and DLLs) and that presents a top level user interface for peripheral management. Such top level user interface should provide user access to a collection of specific pages for management of the herein described novel interface and associated peripheral (e.g. status, configuration, and jobs).

The invention provides Web redirect functionality which supports a Web-based peripheral management solution based upon JAVA applets and a top-level UI generator located on a content server. There are HTTP daemons (i.e. Web servers) in the Web redirect scheme running on both the interface and a host machine content server. Web browser accesses to the interface HTTP daemon for peripheral or interface content are redirected by the interface HTTP daemon to a content server where the actual HTML or JAVA applet files are stored. The interface also generates HTML stub files to aid in redirecting accesses to JAVA applets on the content server.

Figure 1:
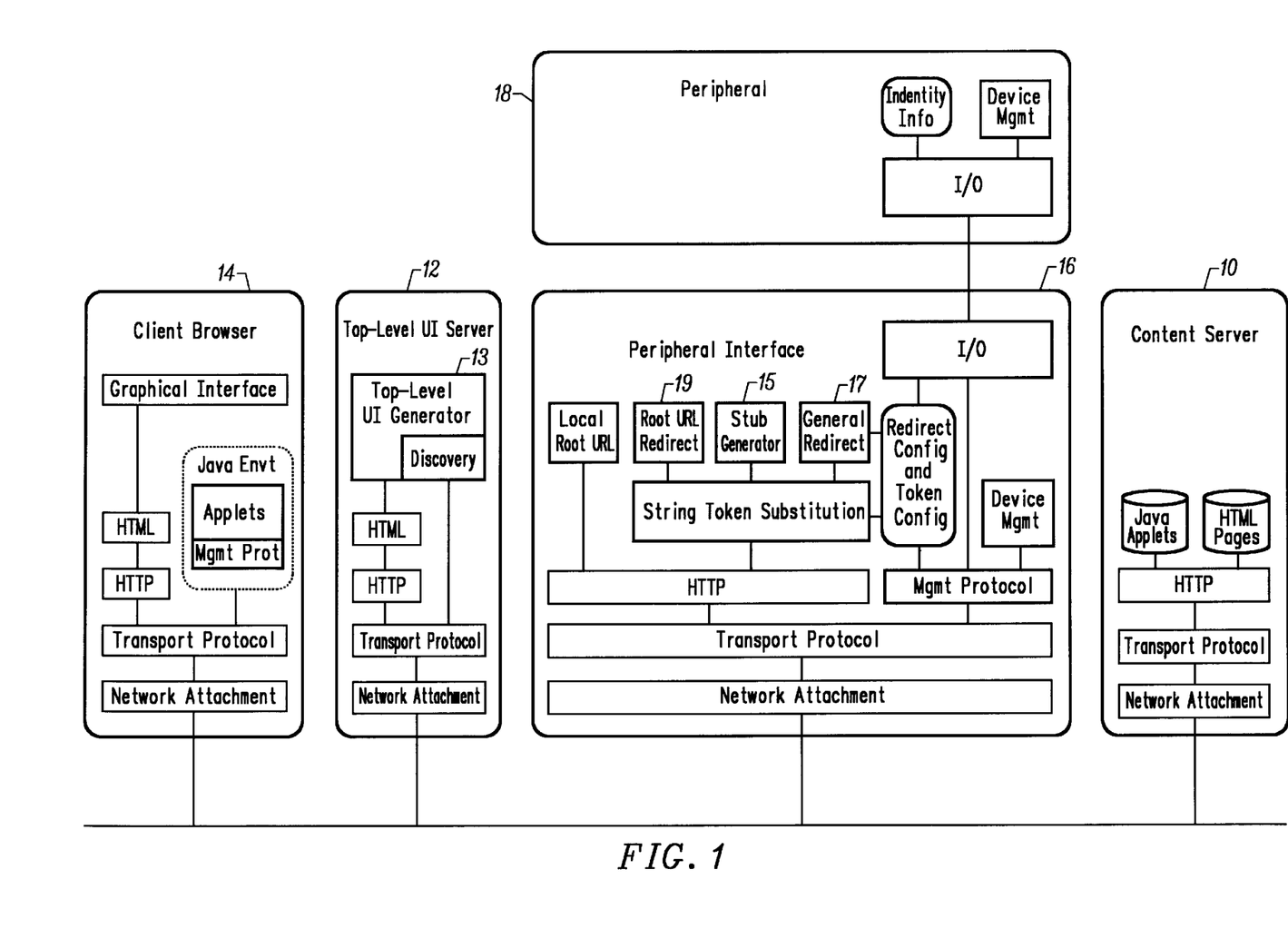
FIG. 1 is a block schematic diagram that presents a specific implementation of a Web redirect mechanism according to the invention.

FIG. 1 is a block schematic diagram that shows the primary system components, which include the following:

Client Browser 14;

Top level UI Server (TLUI) 12;

Peripheral 18;

Peripheral Interface 16; and

Content Server 10.

Operation of the invention is described below in connection with FIGS. 2–7.

Figure 2:
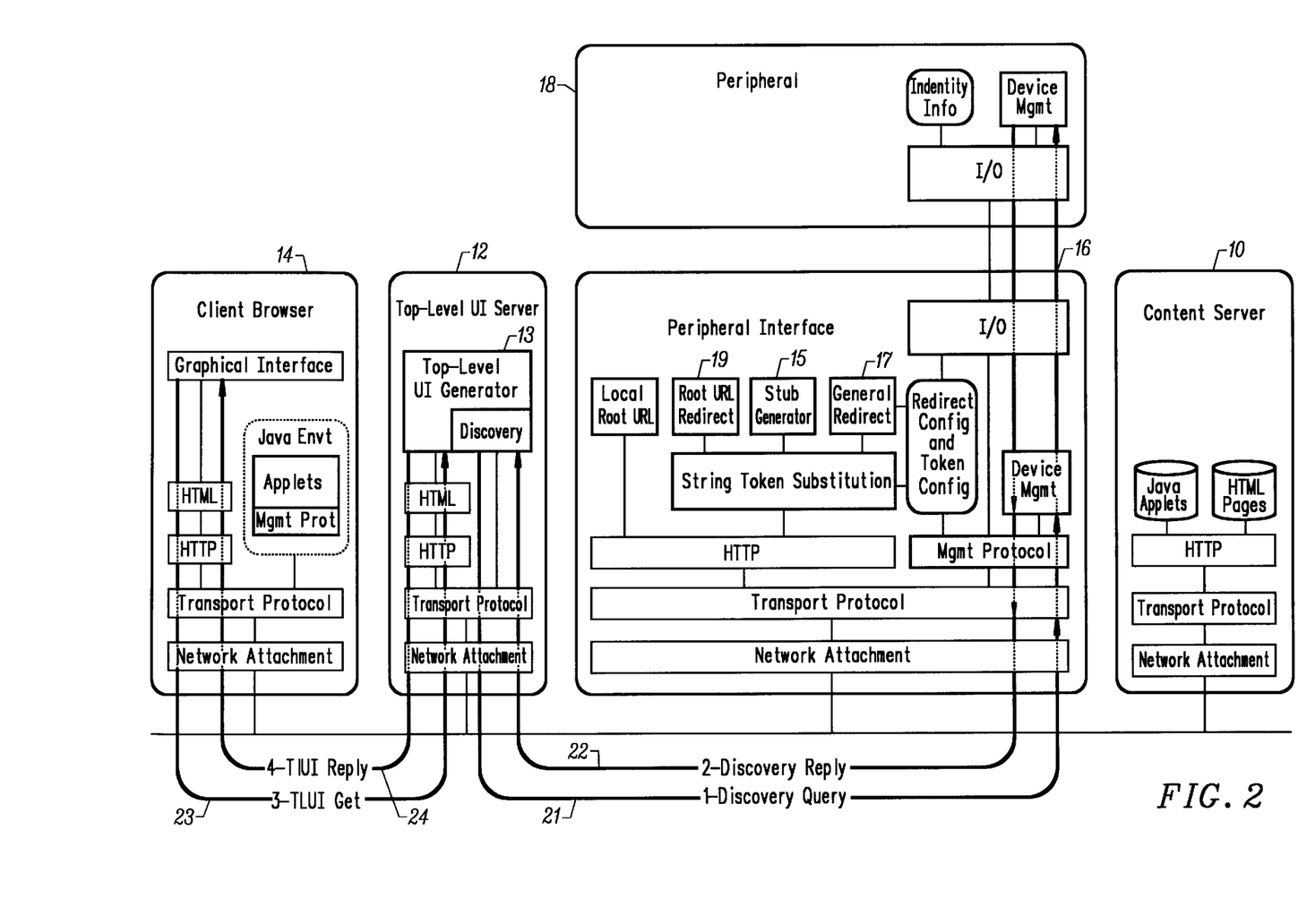
FIG. 2 is a block schematic diagram that show device discovery, top level UI generation, and client browser fetch of a top level UI page according to the invention.

FIG. 2 is a block schematic diagram that shows device discovery, top level UI generation, and client browser fetch of a top level UI page. Operation of this embodiment of the invention involves the following actions, which are identified on FIG. 2 by lines 21–24.

Step 1—Discovery Query (21)

The top level UI server sends out queries on the network to locate the available peripheral interfaces and peripherals. Various discovery and management protocols may be used to discover available devices and retrieve information about each of those devices. Initial queries can be broadcast or multicast to groups of devices for discovery purposes, followed by queries directed to each device to obtain device specific identification information.

Step 2—Discovery Reply (22)

Each device replies with the requested information to the top level UI server's query or queries.

Step 3—TLUI Get (23)

The user interacts with the client browser in some manner that causes the client browser to send an HTTP GET to the top level UI (TLUI) server for the URL of the TLUI page (e.g. entering a URL, choosing an item from a Favorites/Bookmark/History list).

Step 4—TLUI Reply (24)

The top level UI server receives the GET and invokes the top level UI generator 13. The top level UI generator constructs HTML for the TLUI page (it may dynamically generate this HTML). On the TLUI page, there is a peripheral management hypertext link that the user can follow to invoke a peripheral-specific management Java applet. The URL associated with this hypertext link is the URL of the stub generator 15 on the peripheral interface. This URL includes parameters that are passed to the stub generator and which are essentially the text for an APPLET tag that references the peripheral management Java applet. The client browser receives the TLUI page HTML and presents the graphical TLUI page to the user.

Notes

The TLUI may be more complicated than described, consisting of multiple pages and/or frame areas on the screen.

The TLUI may be constructed from Java applets rather than HTML pages.

Management is a general term and could include configuration, status, control, or other types of operations with the peripheral interface or peripheral.

The peripheral specific management may be more complicated than described above, consisting of multiples HTML pages and/or Java applets.

Figure 3:
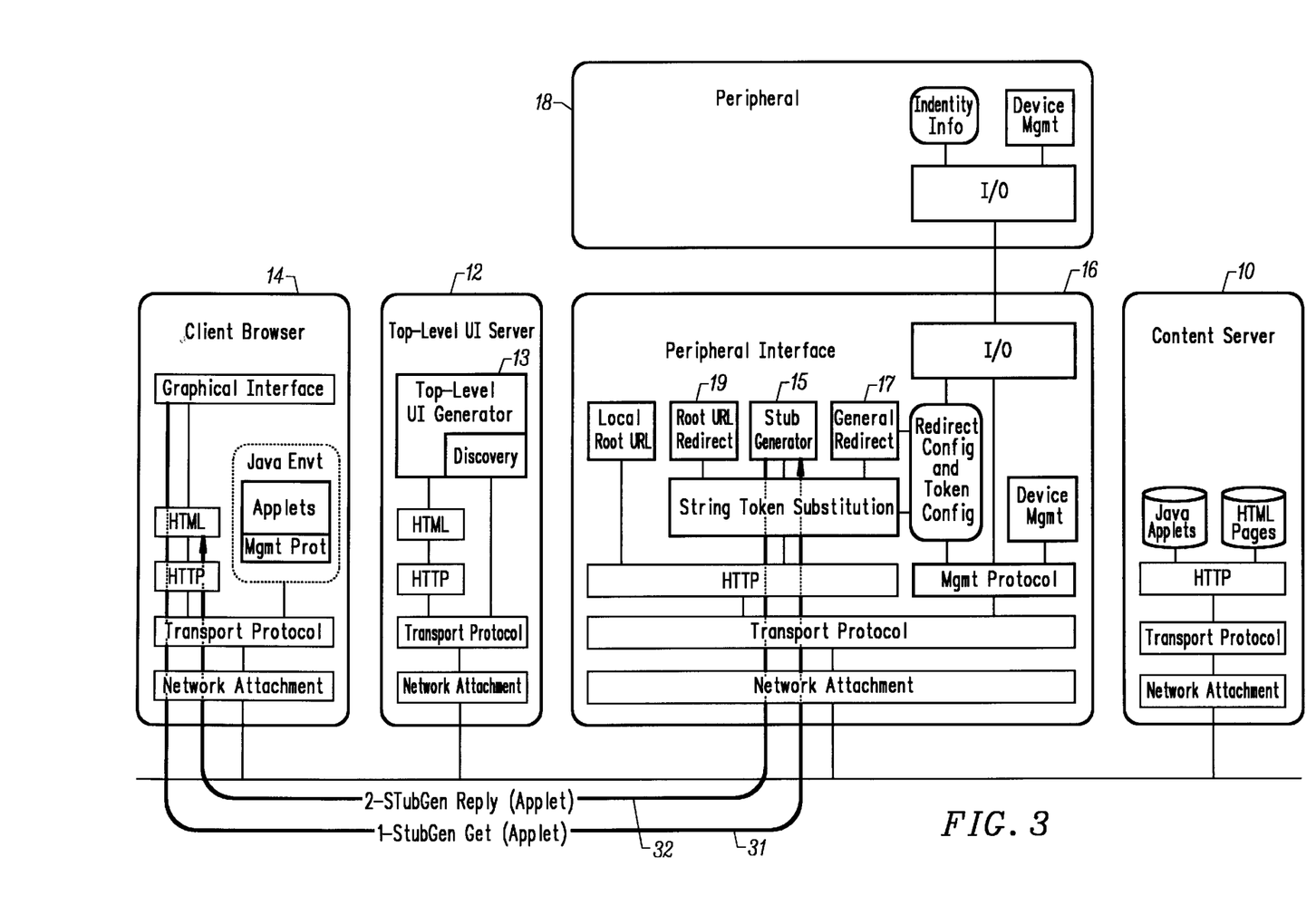
FIG. 3 is a block schematic diagram that shows a user following a link on a page, a client browser invoking the peripheral interface stub generator and receiving an HTML stub file (e.g. to trigger fetch of Java Applet) according to the invention.

FIG. 3 is a block schematic diagram that shows a user following a link on a page, a client browser invoking the peripheral interface stub generator and receiving an HTML stub file (e.g. to trigger fetch of Java Applet). Operation of this embodiment of the invention involves the following actions, which are identified on FIG. 3 by lines 31, 32.

Step 1—StubGen Get (Applet) (31)

When the user follows the peripheral management link on the page, the client browser performs an HTTP GET to the peripheral interface to obtain the URL for the stub-generator, also passing in the URL parameters (e.g. The APPLET tag text).

Step 2—StubGen Reply (Applet) (32)

The peripheral interface receives the GET and invokes the stub generator. The stub generator constructs a small HTML file (termed a stub file) in which the passed-in URL parameters become the body of the HTML file. In this instance, the URL parameter is the text for an APPLET tag, and the resulting HTML stub file contains an APPLET tag that references the peripheral management Java applet. The APPLET tag indicates that the Java applet is located on the peripheral interface. The HTML stub file is returned to the client browser.

Notes

String token substitution may be performed on the contents of the stub file before being sent back to the browser.

Figure 4:
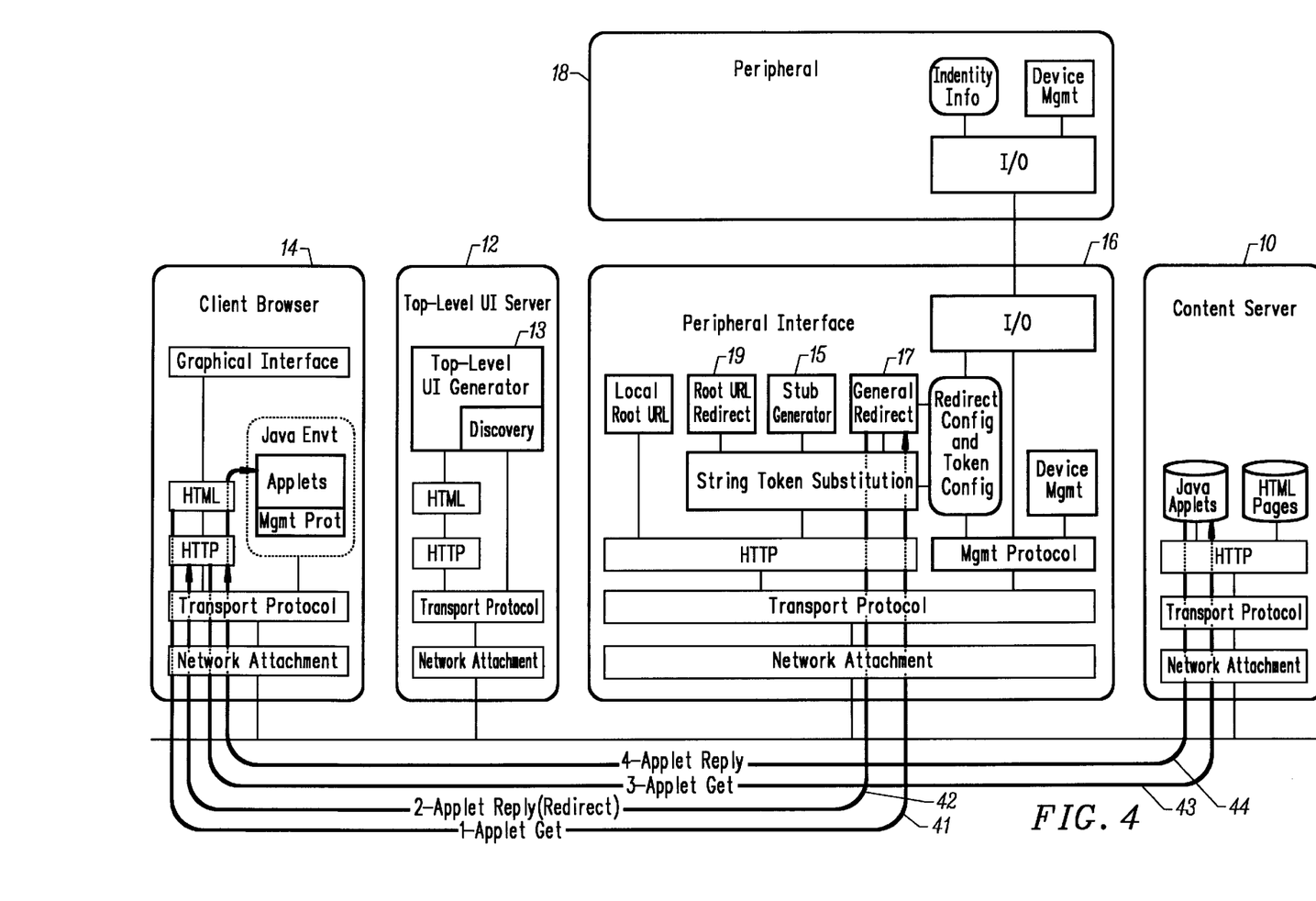
FIG. 4 is a block schematic diagram that shows a client browser fetching a Java applet with HTTP redirection.

FIG. 4 is a block schematic diagram that shows a client browser fetching a Java applet with HTTP redirection. Operation of this embodiment of the invention involves the following actions, which are identified on FIG. 4 by lines 41–44.

Step 1—Applet Get (41)

The client browser receives and processes the HTML stub file. In processing the APPLET tag, the client browser sends an HTTP GET to the peripheral interface, specifying the URL for the Java applet. The URL for the Java applet consists of a special initial directory path component (e.g. /redirect), followed by the relative path to the Java applet.

Step 2—Applet Reply (Redirect) (42)

The peripheral interface detects the /redirect and invokes the general redirect 17. The general redirect sends a reply back to the client browser indicating an HTTP status of temporarily moved. The location field in the reply is the URL of the Java applet on the content server. The general redirect removes the /redirect component from the URL and substitutes in its place the host name and initial path for the location of the Java applet on the content server. The reply is returned to the client browser.

Step 3—Applet Get (43)

The client browser receives the reply and processes the reply with the moved temporarily status. The browser sends an HTML GET to the content server for the URL of the Java applet (as received from the peripheral interface general redirect).

Step 4—Applet Reply (44)

The content server receives the GET, locates the specified Java applet, and returns the Java applet to the client browser. The client browser loads the Java applet into the Java environment and the Java applet starts executing.

Notes

This assumes that the peripheral interface has been previously configured with the URL path to Java applets on the content server.

String token substitution may be performed on the redirect URL in the location field of the redirected reply.

Java class file references also use the same redirection mechanism.

Figure 5:
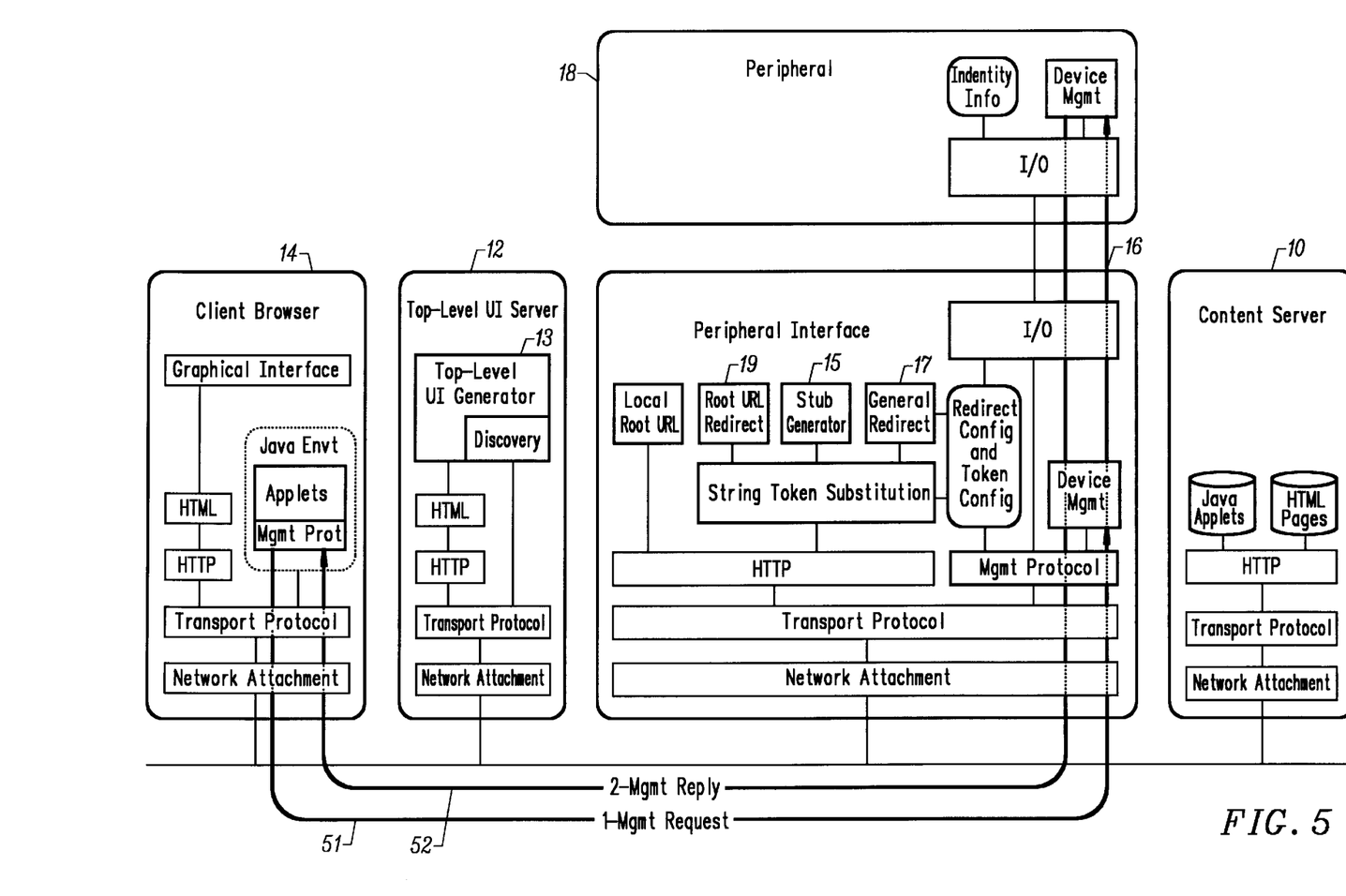
FIG. 5 is a block schematic diagram that shows a Java applet communicating with a peripheral interface and/or peripherals according to the invention.

FIG. 5 is a block schematic diagram that shows a Java applet communicating with a peripheral interface and/or peripherals. Operation of this embodiment of the invention involves the following actions, which are identified on FIG. 5 by lines 51, 52.

Step 1—Mgmt Request (51)

The Java applet sends management requests directly to the peripheral interface and/or peripheral using the appropriate protocols(s) (e.g. SNMP).

Step 2—Mgmt Reply (52)

The peripheral interface and/or peripheral performs the requested management actions and/or returns the requests management information.

Figure 6:
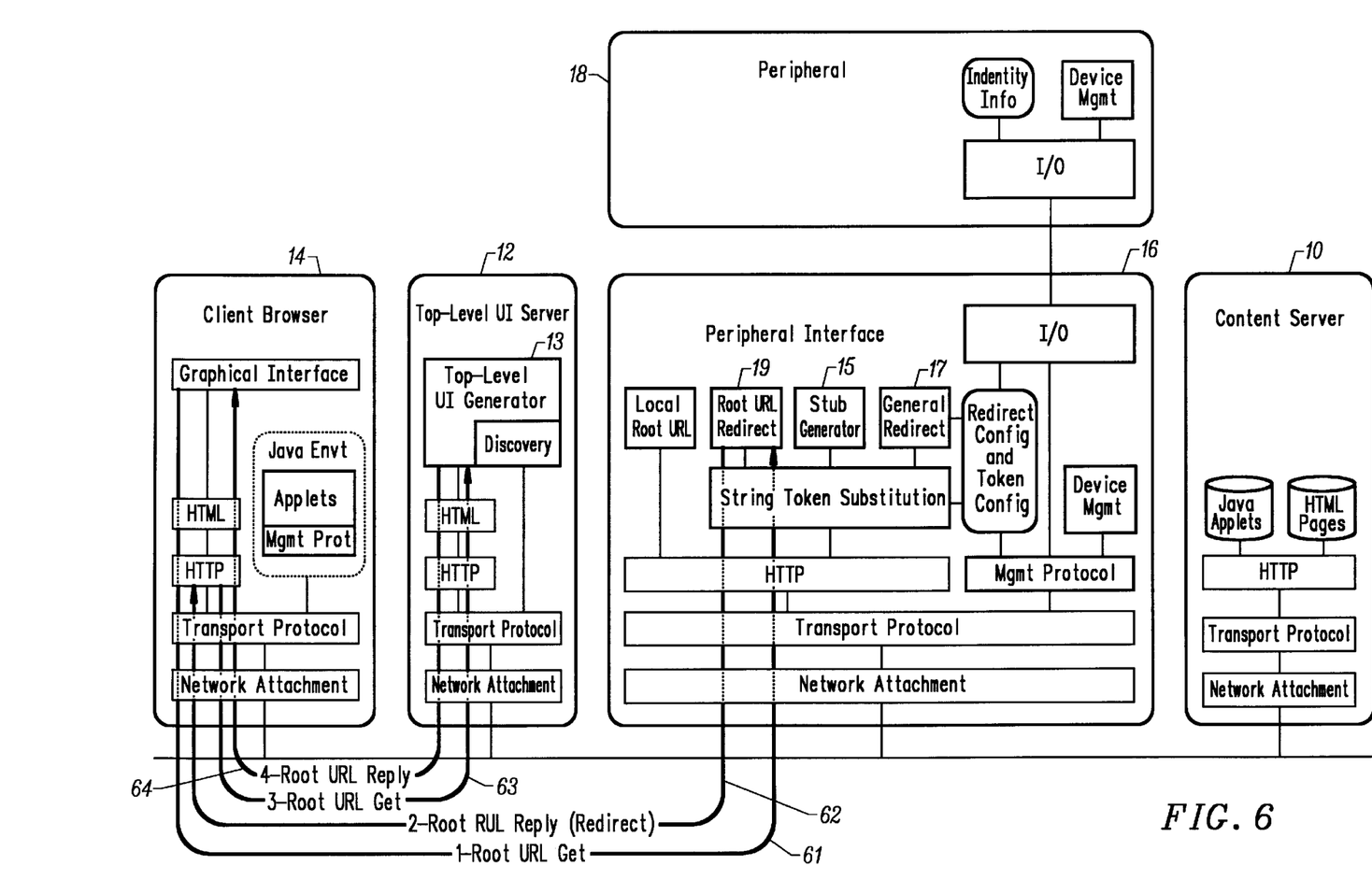
FIG. 6 is a block schematic diagram that shows a client browser accessing a peripheral interface root URL and being redirected to a top level UI generator according to the invention.

FIG. 6 is a block schematic diagram that shows a client browser accessing a peripheral interface root URL and being redirected to a top level UI generator. Operation of this embodiment of the invention involves the following actions, which are identified on FIG. 6 by lines 61–64.

Step 1—Root URL Get (61)

The user interacts with the client browser in a manner that causes the client browser to send an HTTP GET to the peripheral interface for the root URL (/).

Step 2—Root URL Reply (Redirect) (62)

The peripheral interface receives the GET and invokes the root URL redirect 19. The peripheral interface root URL redirect sends a reply with an HTTP status of moved temporarily, and the redirected URL location. In this instance, the redirected URL location is configured on the peripheral interface as the URL of the top level UI generator on the top level UI server. In addition, the redirected URL may include URL parameters that contain peripheral interface and/or peripheral specific information.

Step 3—Root URL Get (63)

The client browser receives the reply and processes the moved temporarily status. The client browser sends an HTML GET to the top level UI server for the URL of the top level UI generator (as received from the peripheral interface root URL redirect including URL parameters).

Step 4—Root URL Reply (64)

The top level UI generator constructs a TLUI page to be returned to the client browser. The top level UI generator may use URL parameters (containing peripheral interface and/or peripheral specific information) to select peripheral interface or peripheral specific page content. The TLUI page is returned to the client browser. The client browser receives the TLUI page HTML and presents the graphical TLUI page to the user.

Notes

Assumes that the root redirect URL has been configured into the peripheral interface.

String token substitution may be performed on the root redirect URL.

Figure 7:
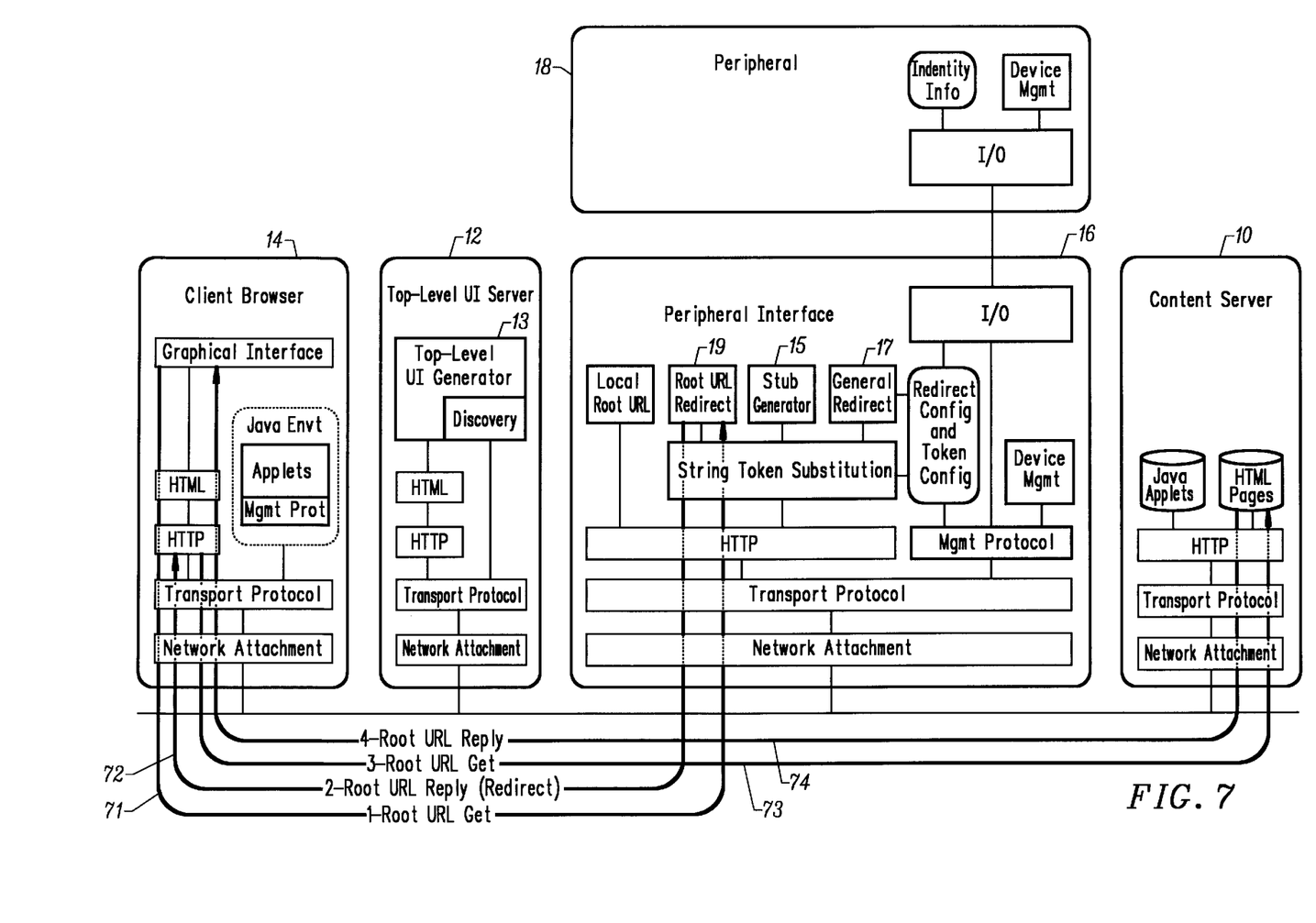
FIG. 7 is a block schematic diagram that shows a browser accessing a peripheral interface root URL and being redirected to an HTML home page according to the invention.

FIG. 7 is a block schematic diagram that shows a browser accessing a peripheral interface root URL and being redirected to an HTML home page. Operation of this embodiment of the invention involves the following actions, which are identified on FIG. 7 by lines 71–74.

Step 1—Root URL Get (71)

The user interacts with the client browser in a manner that causes the client browser to send an HTTP GET to the peripheral interface for the root URL (/).

Step 2—Root URL Reply (Redirect) (72)

The peripheral interface receives the GET and invokes the root URL redirect. The peripheral interface root URL redirect sends a reply with an HTTP status of moved temporarily, and the redirected URL location. In this instance, the redirected URL location is configured on the peripheral interface as the URL of a stand alone HTML home page on the content server.

Step 3—Root URL Get (73)

The client browser receives the reply and processes the moved temporarily status. The client browser sends an HTML GET to the content server for the URL of the stand alone HTML home page (as received from the peripheral interface root URL redirect).

Step 4—Root URL Reply (74)

The content server receives the GET, locates the specified HTML page, and returns the HTML page to the client browser. The client browser displays the page to the user. On the stand alone home page there is a hypertext link that the user can follow to invoke a peripheral-specific management Java applet. The URL associated with this item is the URL of the stub generator on the peripheral interface. The URL includes parameters that are passed to the stub generator and which are essentially the text for an APPLET tag that references the peripheral management Java applet.

Notes

Assumes that the root redirect URL has been configured into the peripheral interface.

The standalone HTML home page may be more complicated than described, consisting of multiple pages and/or frame areas on the screen.

String token substitution may be performed on the root redirect URL.

Web redirect

The basics of the Web redirect scheme are as follows:

A top-level UI generator executes as CGI bin scripts and DLLs on the top-level UI server with the associated URLs. The top-level UI generator provides a high level user interface for peripheral management including, for example, discovery and search capabilities, group management, and navigation. The top-level UI generator feeds HTML pages to the browser to present the top-level UI. These top-level UI HTML pages include hypertext links to URLs for interface and peripheral specific pages. As the user navigates through the top-level UI pages they select interface and peripheral specific pages (e.g. printer status and interface configuration) causing the browser to follow links to these pages by performing HTTP GETs of the URLs for the interface and peripheral specific pages.

The interface and peripheral specific pages are implemented as JAVA applets and classes. They could also be HTML or other files, if desired. These JAVA applet and class files are stored on the content server, load/execute in the browser, and then use SNMP to communicate further with the interface or peripheral.

To load/execute a JAVA applet, the browser follows a hypertext link from the top-level UI page to a small HTML page containing an HTML APPLET tag, which indicates the URL of the JAVA applet file on the content server. The APPLET tag has various parameters which indicate the name of the JAVA applet file (CODE=), the absolute URL to the JAVA applet file directory (CODEBASE=), and the height and width of the screen area occupied by the applet (HEIGHT=, WIDTH=). An HTML stub file mechanism is used to trigger the JAVA applet file fetch which involves both the interface and top-level UI generator:

The interface contains an embedded HTTP daemon (i.e. Web server) which dynamically generates the HTML stub pages that contain the APPLET tags. A specific URL ("/stubgen") on the interface invokes the HTML stub page generator. The interface HTML stub page generator is generic in that it takes a parameter ("body=") following the request URL and uses its value as the body of the HTML page returned to the browser. The interface performs token substitution on the body of the HTML stub page allowing inclusion of configuration/identity information contained on the interface. The substitution tokens include:

The fully qualified domain name and base URL path of the host software's location on the content server;

The interface fully qualified domain name;

The interface MAC address;

The interface model identifier string; and

The peripheral model identifier string.

The top-level UI generator contains information concerning the location of the JAVA applet files on the content server, the height/width of the applet area, and whether the applet file name should be customized to contain strings for the interface type of peripheral type. To invoke a JAVA applet from a top-level UI page, the top-level UI generator places a hypertext link in the page which contains the URL of the interface HTML stub generator. The URL also contains a "body=" parameter which is, in fact, the entire APPLET tag text to be inserted into the HTML stub page returned by the interface. In addition, the APPLET tag text includes any tokens which the top-level UI generator requires the interface to substitute into the HTML stub page, causing modification of the JAVA applet file name or directory path. When the user follows the hypertext link to the interface or peripheral specific page, the browser sends an HTTP GET request to the interface specifying the URL of the stub file generator and passing the "body=" parameter in the request URL. The interface returns to the browser a small HTML page containing the "body=" value with substituted tokens.

Once the browser receives the HTML stub page and processes the APPLET tag, it then proceeds to perform an HTTP GET of the JAVA applet file. To work within the JAVA security constraints, the browser must make the HTTP GET requests for JAVA applet/class file URLs to the interface and have those requests redirected to URLs on the content server. An HTTP redirect mechanism is used which involves both the top-level UI generator and interface.

In the APPLET tag text (which the top-level UI hypertext link passes to the interface HTML stub generator as the body= parameter) is the path to the JAVA applet file (in the CODEBASE= parameter) and the name of the JAVA applet file (in the CODE= parameter). The path specified in the CODEBASE= parameter contains an initial "/redirect" component which is returned unaltered in the HTML stub file and which becomes the path used by the browser when performing an HTTP GET of the JAVA applet file.

The embedded HTTP daemon (i.e. Web server) on the interface performs redirection of any HTTP request which contains a specific initial directory path ("/redirect") in the request URL. For HTTP requests whose URL contains the redirect directory path, the interface sends back an HTTP response which contains a status code "moved temporarily" and a location URL which is the request URL with the /redirect path stripped off and a pre-configured host software base URL inserted in its place. The interface also performs token substitution on the response location URL if any tokens are present.

Once the browser retrieves and starts running the JAVA applet, the JAVA applet makes SNMP requests to the interface or peripheral to perform specific operations.

The interface performs redirection of all HTTP requests for its root ("/") or home page URL similar to the general redirect mechanism. A specific home page URL is configured in the interface. When the interface receives an HTTP request for its home page, it sends back an HTTP response with a status code "move temporarily" and a location URL that has been pre-configured but that undergoes token substitution.

Web Redirect Functions

The Web redirect mechanism is comprised of the following capabilities embedded in firmware:

Configuration Information;

String Processing;

HTTP root URL redirect;

HTML stub file generation;

HTTP general URL redirect; and

Local root page content.

Configuration Information

Several pieces of configuration information are maintained on the interface in support of the Web redirect functionality. The value of each configuration item can be retrieved and set via SNMP. Table 1 (below) lists this configuration information.

TABLE 1

Configuration Information

| Configuration Item | Description |
| --- | --- |
| xRootRedirectURL | The URL used for root page redirection. This is used when redirecting HTTP requests for the root URL. |
| xGeneralRedirectURL | The URL used for general redirection and for token substitution of the "(GeneralRedirectURL)" token. |
| xDomainName | The fully qualified domain name for the interface. This is used for token substitution of the "(DomainName)" token. |
| xTypeTokenDefault | A flag controlling the interface type and peripheral type substitution behavior of the token substitution function. |

String Processing

String processing is performed on various strings which the interface passes to the browser. The specific string processing operations are described below.

Space substitution: Any "+" characters encountered in the string are converted to ASCII space characters.

Escape conversion: Any escape encoded characters which are encountered in the string are converted to their single character equivalent. Common characters in URL parameters passed to the interface which require escape encoding are set forth in Table 2 below.

TABLE 2

Common Characters Which Require Escape Encoding

| Char | URL Encoding |
|---|---|
| " | % 22 |
| < | % 3c |
| > | % 3e |

Token Substitution

As certain tokens are encountered in a string, the interface substitutes the appropriate value. Table 3 below defines the token names/syntax and the values which are substituted. Token names are case-insensitive and are surrounded by the open and close parenthesis "(" and ")" as part of the token name syntax.

TABLE 3

Token Substitution

| Token Name | Substituted Token Value |
|---|---|
| (GeneralRedirectURL) | The value contained in the xGeneralRedirectURL configuration item. |
| (DomainName) | The value contained in the xDomainName configuration item. |
| (InterfaceMAC) | The 12 hexadecimal digit MAC address of the interface. |
| (InterfaceType) | A string indicating the interface type which can be used to customize a directory path or file name within a URL. If the xTypeTokenDefault configuration item is set to disable(0), then the string "Default" is the substituted value. If the item is set to enable(1), then normal token substitution is performed. |
| (PeripheralType) | A string indicating the peripheral type which can be used to customize a directory path or file name within a URL. The string is the MODEL string from the peripheral's ID string with the spaces converted to underscore ("_") characters (e.g. HP_LaserJet_5Si). If the xTypeTokenDefault configuration item is set to disable(0), then the string "Default" is the substituted value. If the item is set to enable(1), then normal token substitution is performed. |

HTTP Root URL Redirect

The HTTP root page redirect function performs redirection of HTTP GET or HEAD requests for the root URL ("/"). When the interface receives an HTTP request for the root URL ("/"), it returns an HTTP response with a status code "moved temporarily" and a location field indicating the actual URL to access.

The location field value is produced by taking the xRootRedirectURL configuration item value and performing token substitution on this value. If the xRootRedirectURL item has not been configured, the interface reverts to its stand alone behavior.

HTML Stub File Generation

HTML stub file generation allows dynamic generation of small HTML files with the content of the HTML file being passed in as a parameter on the request URL. This mechanism can be used to generate small HTML files containing an APPLET tag for invoking a JAVA applet and which have some portion of the HTML file body customized with information specific to a particular interface.

HTML stub file generation occurs when an HTTP GET or HEAD request is received for the "/stubgen" URL. The value of the ?body= parameter at the end of the request URL is used as the body of the returned HTML stub file. String processing is performed on the body of the HTML stub file before it is returned to the requester.

If the following request URL is specified:

http:/jetdirect1.rose.hp.com/stubgen?body=this+is+the+body+of+the+HTML+stub+file Then the returned HTTP header is:

HTTP/1.0 200 OK

And the returned HTML content is:

<HTML>

<HEAD>

<TITLE>stub file</TITLE>

<HEAD>

<BODY> this is the body of the HTML stub file

</BODY>

</HTML>

HTTP General URL Redirect

The HTTP general redirect function performs redirection of HTTP GET, HEAD, and POST requests for all URLs with a certain initial path component. When the interface receives an HTTP request for a URL that has an initial path component of "/redirect", it returns an HTTP response with a status code "moved temporarily" and a location field indicating the actual URL to access. The location field value is produced by taking the request URL, replacing the "/redirect" component with the value of the xGeneralRedirectURL configuration item, and performing token substitution on the resulting URL.

If the xGeneralRedirectURL item has not been configured, the interface returns an HTTP response with a status code.

Host Software Usage

There are a number of ways in which host software can utilize the Web redirect functionality.

EXAMPLE 1

This example shows the general HTML stub file and HTTP redirect usage. The example configuration is as shown in Tables 4 and 5 below.

TABLE 4

Example 1: Web Server Setup

Content Server Setup

| | |
|---|---|
| http://server.rose.hp.com/Webjetadmin | Base URL for where the host software is installed |
| http://server.rose.hp.com/Webjetadmin/java | Directory where JAVA applet/class files are stored |
| http://server.rose.hp.com/Webjetadmin/java/Printerstatus.class | JAVA applet for printer status |
| http://server.rose.rose.com/Webjetadmin/Webjetadmin.exe | URL for top-level UI home page (an "?addr=xxx" parameter causes top-level UI to display the specific page automatically for the interface/peripheral with that address) |

TABLE 5

Example 1: Interface Configuration

| Interface Configuration | |
|---|---|
| printer1.rose.hp.com | xDomainName - pre-configured domain node name for the interface |
| http://server.rose.hp.com /Webjetadmin/Webjetadmin.exe?addr=(InterfaceMAC) | xRootRedirectURL - pre-configured home page redirect) |
| http://server.rose.hp.com/Webadmin | xGeneralRedirectURL - pre-configured general redirect URL (where host software is installed) |
| enable(1) | xTypeTokenDefault - pre-configured interface-type and peripheral-type token substitution behavior |

An example set of files and sequence of actions is as follows:

The top-level UI generator feeds an HTML page to the browser. This page contains a desired printer status hyperlink as follows:

<A HREF="http://printer1.rose.hp.com/stubgen?body=
"<APPLET+CODE="Printerstatus.class"+
CODEBASE="http://(lnterfaceName)/redirect/java/"+
HEIGHT=500+WIDTH=500>+<PARAM+NAME=
LANG+VALUE=E N>+</APPLET>">Printer Status</A>

However, because some of the characters in the URL parameter need to be encoded, the actual printer status hypertext link is as follows:

<A HREF="http://printer1.rose.hp.com/stubgen?body=
%22%3cAPPLET+CODE=
%22Printerstatus.class%22+CODEBASE=%22http://
(InterfaceName)/redirect/java/%22+HEIGHT=500+
WIDTH=500% 3e+%3cPARAM+NAME=LANG+
VALUE=EN%3e+%3c/APPLET%3e%22>Printer
Status</A>

When the user follows the printer status hypertext link, the browser sends an HTTP GET request to the interface (printer1.rose.hp.com) with the following (note that the /java/ directory is always in a fixed position relative to the interface xGeneralRedirectURL path):

GET /stubgen?body=%22%3cAPPLET+CODE=
%22Printerstatus. class%22+CODEBASE=%22http://
(InterfaceName)/redirect/java/% 22+HEIGHT=500+
WIDTH=500%3e+%3cPARAM+NAME=LANG+
VALUE=EN%3e+%3c/APPLET%3e%22 HTTP1.0

The interface processes the HTTP request for stub generation, and returns the following HTML page as a response (substitution was done on the "(InterfaceName)" token):

<HTML>
<HEAD>
<TITLE>stub file<TITLE>
<HEAD>
<BODY>
<APPLETCODE="Printerstatus.class"
CODEBASE="http://printer1.rose.hp.com/redirect/java/"
WIDTH=500
HEIGHT=500><PARAM NAME=LANG VALUE=
EN></APPLET>
</BODY>
</HTML>

The browser processes the HTML stub page, and sends an HTTP GET request to the interface (printer1.rose.hp.com) as follows:

GET /redirect/java/Printerstatus.class HTTP1.0

The interface processes the HTTP request for redirect, and returns an HTTP response with the following information (the /redirect path was stripped and the server base URL inserted):

HTTP/1.0 302 Moved Temporarily
Location: http://server.rose.hp.com/Webjetadmin/java/Printerstatus.class The browser processes the HTTP response, and sends an HTTP GET request to the content server as follows:

GET /Webjetadmin/java/Printerstatus.class HTTP1.0

The content server processes the HTTP request and returns the contents of the JAVA applet file.

[JAVA applet contents]

A browser accessing the interface root or home page directly sends an HTTP request to the Interface as follows:

GET/HTTP1.0

The interface sends a HTTP response with the following fields (substitution was done on the "(InterfaceMAC)" token in the pre-configured interface home page URL redirect):

HTTP/1.0 302 Moved Temporarily
Location: http://server.rose.hp.com/Webjetadmin/Webjetadmin.exe?addr=080009123456

The browser processes the response and sends an HTTP request to the content server as follows:

GET /Webjetadmin/Webjetadmin.exe?addr=
080009123456 HTTP1.0

The content server processes the HTTP request, invokes the top-level UI generator, and returns an HTML page for the top-level UI:

[HTML page content for top-level UI]

Stand Alone Root URL Behavior

When the interface has not yet been configured with a xRootRedirectURL value it functions in stand alone mode because it cannot identify a content server to handle requests for its root page.

Stand alone options include:

Do not response to HTTP requests.

Respond with an HTML page containing text indicating the location of the WebJetAdmin software.

Respond with an HTML page containing simple peripheral/interface status and identify information and text indicating the location of the WebJetAdmin software.

Provide configuration pages equivalent to Telnet configuration capabilities.

HTTP Redirection

The HTTP protocol supports the redirection of browser generated HTTP requests from one HTTP daemon to another. This is accomplished as follows:

The browser sends an HTTP request to an HTTP daemon specifying the request URL.

The HTTP daemon sends an HTTP response back to the browser with a status code "moved permanently" or "moved temporarily" and with the new URL given by the location field in the response. The HTTP daemon has considerable latitude in what the new URL is and can dynamically generate the new URL if it desires. The new URL can indicate an HTTP daemon on another machine (e.g. a content server).

The browser receives the HTTP response and then sends an HTTP request to the new URL where the actual content is stored.

The HTTP daemon processes the HTTP request and sends back a response to the browser with the actual content.

JAVA Applets Invocation

A JAVA applet resides in a file which is loaded from an HTTP daemon (i.e. Web server) into a browser, and executed within the JAVA execution environment on that browser. A JAVA applet must be invoked via an APPLET tag from within an HTML file. The HTML APPLET tag has the following syntax (there may be other parameters between the applet start tag and end tag):

<APPLET CODE=xxx CODEBASE=xxx HEIGHT=xxx WIDTH=xxx>
</APPLET>

The APPLET tag parameters are as follows:

CODE—specifies the name of the file containing the JAVA applet relative to the CODEBASE URL (e.g. Printerstatus.class);

CODEBASE—specifies the base URL of where the JAVA applet is located including the domain name and directory path (e.g. http://server.rose.hp.com/Webjetadmin/java/);

HEIGHT—reserved page area height in pixels; and

WIDTH—reserved page area width in pixels.

An HTML stub file to run a JAVA applet appears as follows:

<HTML>
<HEAD>
<TITLE>Printer Status</TITLE>
<HEAD>
<BODY>
<APPLET CODE="Printerstatus.class"
CODEBASE="http://server.hp.com/Webjetadmin/java"
WIDTH=500 HEIGHT=500>
</APPLET>
</BODY>
</HTML>

Loading and running a JAVA applet in a browser involves the following steps:

The user clicks on a screen area causing the browser to follow a hyperlink. The hyperlink URL is the URL for the HTML stub file.

The browser does an HTTP GET of an HTML stub file URL.

The HTTP daemon returns the contents of the requested HTML stub file. The HTML stub file contains the APPLET tag indicating the URL of the JAVA applet file. The browser reads and processes the HTML stub file contents and encounters the APPLET tag The browser does an HTTP GET of the JAVA applet file URL. Normally, the browser reconnects to the HTTP daemon from which it received the HTML stub file to also get the JAVA applet file. However, if the CODEBASE parameter is specified in the HTML stub file, then the browser connects to the HTTP daemon URL specified in the CODEBASE tag to get the JAVA applet file.

The HTTP daemon returns the contents of the requested JAVA applet file. The browser reads the JAVA applet file contents, loads it into memory, and runs it within the JAVA execution environment.

The JAVA applet may then make SNMP/PML and/or HTTP accesses to collect needed information for the user interface presentation.

JAVA Security and Redirects

The current JAVA security model imposes the constraint that an executing JAVA applet can only conduct network communication with the host from which the JAVA applet was originally loaded. Thus, a JAVA applet can only send SNMP packets to an interface if the browser loaded the JAVA applet from that interface via an HTTP GET.

However, using the HTTP redirect mechanism, it is possible for the JAVA applet to be stored on a content server rather than on the interface or peripheral, yet still function within the JAVA security constraints. To do so, the interface must respond to the HTTP GET of the JAVA applet with the HTTP moved temporarily status code and specify the actual location (URL) of the JAVA applet in the location field of the HTTP response.

In addition, an executing JAVA applet may reference and fetch a number of class files. These class files are located relative to, and along with, from wherever the JAVA applet was fetched.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A redirection mechanism for providing increased content for one or more resource constrained devices on an electronic network, said mechanism comprising:

a browser associated with a user location;

a content server;

a peripheral interface comprising an embedded daemon which dynamically generates stub pages that contain applet tags, wherein a specific address at said peripheral interface invokes a stub page generator that takes a parameter following a request address and uses said parameter value as the body of a stub page returned to said browser; and a user interface generator associated with a user interface server, said user interface generator providing system wide addressing and a user interface for management of said resource constrained device, said user interface generator providing information pages to said browser, said information pages including links to addresses for peripheral interface and device specific pages, wherein said peripheral interface and device specific pages are stored on said content server, and wherein user navigation through information pages selects peripheral interface and device specific pages, wherein said browser follows said links to these peripheral interface and device pages.

2. The redirection mechanism of claim 1, wherein said browser follows said links to said peripheral interface and device pages by getting addresses for peripheral interface and device specific pages.

3. The redirection mechanism of claim 1, wherein said peripheral interface and device specific pages are implemented as applet and class files, wherein said applet and class files load and execute in said browser, and wherein said applet and class files communicate with said peripheral interface and thereby said device.

4. The redirection mechanism of claim 1, wherein said browser contacts said peripheral interface, and wherein said peripheral interface redirects said browser using information page redirection.

5. The redirection mechanism of claim 4, wherein said browser contacts said user interface server at a redirected location that contains said link, wherein said link instructs said user interface server to contact said peripheral interface from a redirect address and pass data contained at said address to said peripheral interface, causing a page to be sent to said browser from said peripheral interface, said page containing a reference to an applet file.

6. The redirection mechanism of claim 5, wherein said applet file reference establishes a contact to said peripheral interface at said redirect address, thereby downloading said applet file to enhance the functionality of said peripheral interface.

7. The redirection mechanism of claim 6, wherein said browser downloads said applet file from a redirect location on said content server.

8. The redirection mechanism of claim 7, wherein said browser communicates with said peripheral interface to retrieve required information once said applet file has been loaded by said browser.

9. The redirection mechanism of claim 1, said user interface generator further comprising:
a stub file mechanism for triggering an applet file fetch.

10. The redirection mechanism of claim 9, wherein said peripheral interface performs either of token substitution on the body of said stub page allowing inclusion of any of configuration and identity information contained on said peripheral interface, and string processing, including space substitution and escape conversion.

11. The redirection mechanism of claim 10, wherein said substitution tokens include any of a fully qualified domain name and base URL path of a host software location on said system server; an interface fully qualified domain name; an interface MAC address; an interface model identifier string; and a peripheral model identifier string.

12. The redirection mechanism of claim 1, wherein said user interface generator contains information concerning the location of applet files on said content server, the height/width of said applet area, and whether said applet file name should be customized to contain strings for said peripheral interface or device type.

13. The redirection mechanism of claim 1, wherein said user interface generator invokes an applet from a user interface page by placing a link in said user interface page that contains said specific address of said peripheral interface stub generator.

14. The redirection mechanism of claim 12, wherein said body parameter is an entire applet tag.

15. The redirection mechanism of claim 14, wherein said applet tag text includes any tokens that said user interface generator requires said peripheral interface to substitute into said stub page, causing modification of said applet file name or directory path.

16. The redirection mechanism of claim 11, wherein said browser sends a request to said peripheral interface specifying said specific address of said stub file generator and passing said body parameter in said request address when a user follows said link to either a peripheral interface or device specific page; and wherein said peripheral interface returns a page containing a body value containing substituted tokens to said browser.

17. The redirection mechanism of claim 16, wherein said browser receives said stub page and processes said applet tag, and then gets an associated applet file.

18. The redirection mechanism of claim 17, wherein said browser must make a get request for applet file addresses to said peripheral interface and have those requests redirected to addresses on said content server.

19. The redirection mechanism of claim 17, wherein an applet tag text, which said user interface generator link passes to said peripheral interface stub generator, is the path to said applet file and the name of said applet file, wherein said path contains an initial redirect component which is returned unaltered in said stub file and which becomes the path used by said browser when getting said applet file.

20. The redirection mechanism of claim 19, wherein an embedded daemon on said peripheral interface performs redirection of any request which contains a specific initial directory path in the request address.

21. The redirection mechanism of claim 20, wherein said peripheral interface sends back a response which contains a status code and a location address which is a request address with a redirect path stripped off and a pre-configured host software base address inserted in its place for requests whose address contains a redirect directory path; and wherein said peripheral interface also performs token substitution on a response location address if any tokens are present.

22. The redirection mechanism of claim 21, wherein said applet makes requests to either of said peripheral interface and said device to perform specific operations once said browser retrieves and starts running said applet.

23. The redirection mechanism of claim 22, wherein said peripheral interface performs redirection of all requests for either of said peripheral interface root or home page address, wherein a specific home page address is configured in said peripheral interface, wherein said peripheral interface responds with a status code and a location address that has been pre-configured but that undergoes token substitution when said peripheral interface receives a request for said peripheral interface home page.

24. A method for supporting redirection of browser generated requests from one daemon to another, comprising the steps of:
using a browser to send a request for content to a daemon specifying the request address;
using said daemon to send a response back to said browser with a status code and with a new address given by a location field in said response;
receiving at said browser said response and then sending request to said new address where said content is actually stored;
processing said request with said daemon processes and sending back a response to said browser with said content.

25. A method for loading and running an applet in a browser, comprising the steps of:
causing said browser to follow a link which is the address for a requested stub file;
using said browser to get said stub file;
using a daemon to return the contents of said requested stub file, wherein said stub file contains an applet tag indicating the address of an applet file;
using said browser to read and process said stub file contents and encounter said applet tag;
using said browser to get an applet file address, wherein said browser either reconnects to said daemon from which it received said stub file to also get said applet file, or said browser connects to a daemon address specified in a tag to get said applet file if a parameter is specified in said stub file;
using said daemon to return the contents of said requested applet file; and
using said browser to read said applet file contents, load said applet file into a memory, and run said applet file within an applet execution environment;
wherein said applet may then make accesses to collect needed information for user interface presentation.

* * * * *